Figure 1:
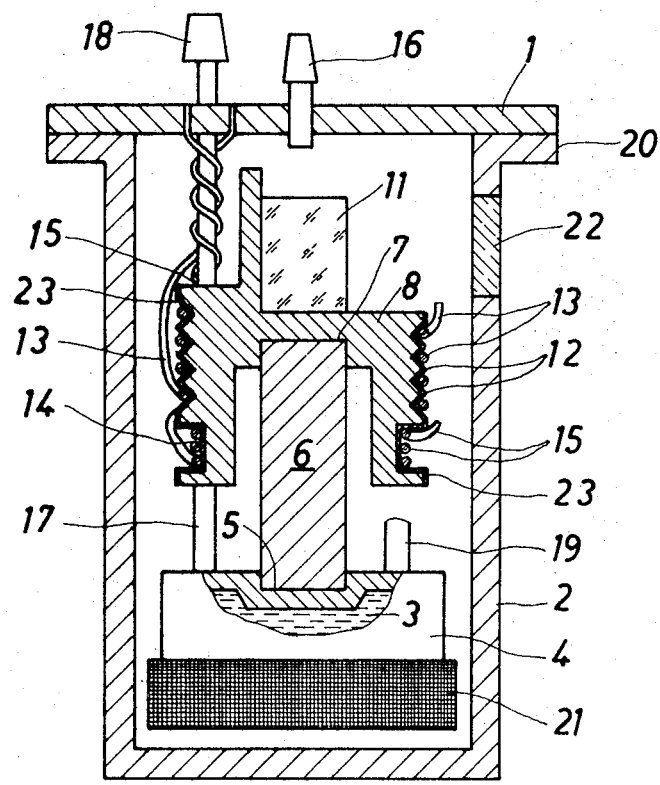

United States Patent

[11] 3,583,207

[72] Inventors: Peter Ullman; Bruno Kandler, both of Jena, Germany
[21] Appl. No.: 703,504
[22] Filed: Jan. 2, 1968
[45] Patented: June 8, 1971
[73] Assignee: VEB Carl Zeiss Jena, Jena, Germany

[54] SPECIMEN CARRIERS FOR PHYSICAL TESTS AT LOW TEMPERATURES
7 Claims, 3 Drawing Figs.

[52] U.S. Cl. .................. 73/15R, 73/193
[51] Int. Cl. .................. G01n 1/00
[50] Field of Search .................. 73/190, 15, 193

[56] References Cited
OTHER REFERENCES

Hill, R. W., "Apparatus for Low Temperature Calorimetry"; JOURNAL OF SCIENTIFIC INSTRUMENTS vol. 30, September 1953 pages 331— 334; available class 73/190

Aven, M. H. et al.; "Adiabatic Specific Heat Calorimeter—; REVIEW OF SCIENTIFIC INST., vol. 27, no. 8; Aug. 1956, pp. 623— 628, avail. 73/190

Seidel G. et al.; "$He^3$ Cryostat for Measuring specific Heat"; REVIEW OF SCIENTIFIC INST., vol. 29, no. 7, July 1958; pp. 606— 611, available 73/190

Primary Examiner—Richard C. Queisser
Assistant Examiner—John K. Lunsford

ABSTRACT: A specimen carrier suitable for physical tests at low and very low temperatures at coated with an electrically insulating layer of chemical compound of the material from which it is made. If the specimen carrier is of aluminum or an aluminum alloy of good thermal conductivity, said layer may be obtained by eloxation. The wire of a resistance thermometer is wound around the part of the specimen carrier which does not receive the specimen. The thermometer wire is connected with the specimen carrier for example by cementing.

PATENTED JUN 8 1971

3,583,207

INVENTORS
Peter Ullmann
Bruno Kandler

SPECIMEN CARRIERS FOR PHYSICAL TESTS AT LOW TEMPERATURES

This invention relates to specimen carriers suitable for physical tests at low and lowest temperatures which are connected with a cooling medium for transfer of heat therebetween and are made from material of good thermal conductivity and by means of which a resistance thermometer is attached to the specimen for measuring the temperature thereof.

In some physical testing methods, operating for example on the principles of thermoluminescence, fluorescence, absorption, photo conductivity, high-frequency spectrometry or Mossbauer spectrometry, as well as on the underlying principles, low and very low temperatures under vacuum conditions are absolutely indispensable. In many cases the specimen is required to be heated under control. In thermoluminescence tests, for example, the heating of a specimen after excitation at low temperature is a necessary prerequisite, and the temperature is desired to rise linearly. Such tests call for specimen holders which permit the temperature of the cooling means to be imported to the specimen, and the temperature of the specimen to be measured as accurately as possible, and which permit the specimen to be heated according to a desired heating program and recorded.

The temperature of the specimen carrier can in principle be measured by means of gas thermometers, thermocouple elements or resistance thermometers. The use of accurate gas thermometers is complicated, if not impeded, by the requirement of much space near the specimen and the considerable heat capacity of the thermometer. These two features retard the rise of temperature in the thermometer relatively to that in the specimen and thus prevent the linearity of the heating program or the connection of electronic control means. The use of thermocouple elements is also not a practical solution, since it is not easy in this case to obtain good contact with the specimen or so to fashion the contact as to ensure consistent heat transmission for a series of measurements. For this reason thermocouple elements are hardly ever used for measuring temperatures below 20° Kelvin, as they are too inaccurate in that region.

Resistance thermometers can be so constructed that they are in very good heat contact with the specimen carrier even if the heat capacity is low, so that, in the process of heating, there is no appreciable retardation in the response of the thermometer to the rise in temperature in the specimen. In using a resistance thermometer for the purpose here in question, care must of course be taken that the specimen carrier is of material of good heat conductivity and, accordingly, good electric conductivity, and that the wire of the resistance thermometer is in close contact with, but electrically insulated from the specimen carrier. Accordingly, the wire or the specimen carrier are surrounded by varnish or a similar substance. Not only is this arrangement of great technological complexity but the heat conductivity is reduced and there is every reason to fear that repeated changes of temperature will cause the varnish to crack and the thermometer wire to break. Cracks in the varnish coat are inimical to electric insulation.

The present invention aims at obviating these disadvantages by providing a specimen carrier of the foregoing kind to which a resistance thermometer is so attached that the heat transmission between carrier and thermometer owing to complete electrical insulation independent of temperature has a maximum value.

To this end the invention consists in a specimen carrier suitable for physical tests at low temperatures characterized in that it is coated with an electrically insulating layer of a chemical compound of the material from which is is made, and that its surface not in contact with the specimen is at least partly surrounded by a coil of thermometer wire. The insulating layer may be applied chemically or electrochemically, and it will not crack when exposed to changes of temperature. If the specimen carrier is cylindrical, the thermometer wire may be so wrapped around the surface that the windings do not touch each other.

To prevent the thermometer wire from slipping and to ensure reproducible temperature measuring, it is advantageous rigidly to connect the thermometer wire with the specimen carrier. This connection may be obtained by cementing the thermometer wire contacting the surface of the carrier along a line.

To obtain safe electric insulation of the windings of the thermometer wire from each other, on the one hand, and to safegaurd an efficient heat exchange between the thermometer wire and the specimen carrier, on the other, this carrier has advantageously a helical groove cut into it for the wire.

A most suitable material for the specimen carrier according to the invention is aluminum, or an aluminum alloy, of good heat conductivity which, by anodic treatment, can easily be provided with an electrically insulating layer specific to this material. The material best suited for thermometer wire in measurements of low and lowest temperatures is, for example, platinum, lead or phosphor bronze.

Because of the particular use of the specimen carrier and its exposure to rapid temperature changes, this carrier is advantageously in the shape of a hollow body. If the specimen carrier is covered at one end, the specimen may be placed on the cover surface. If the specimen carrier is a hollow body open at both ends, an arrangement of the specimen in the interior is particularly advantageous, for example for measuring emission and permeability.

Mechanical and thermal connection of carrier and cooling bath is obtained by means of German silver, the slight thermal conductivity of which keeps an evaporation of the cooling means within tolerable limits during the heating of the specimen.

Figure 2:
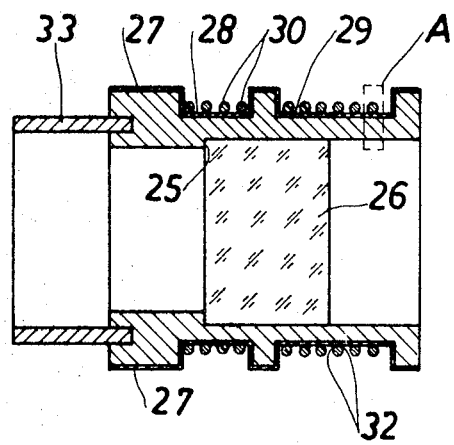
Figure 3:
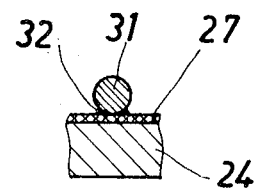

In order that the invention may be more readily understood, reference is made to the accompanying drawings which illustrate diagrammatically and by way of example two embodiments thereof, and in which FIG. 1 shows a cryostat with specimen carrier, partly in section and partly in front elevation, FIG. 2 shows another specimen carrier in longitudinal section, and FIG. 3 shows on an enlarged scale the part A of FIG. 2.

In FIG. 1 of the drawings, a receiver 2 covered by a lid 1 contains a tank 4 filled with a liquid 3. The tank 4 is in part surrounded by an absorption pump 21 and has a recess 5 into which one end of a heat-resistant rod 6 of German silver extends. The other end of the rod 6 extends into a recess 7 in a specimen carrier 8, so that the rod 6 is positively connected with the tank 4 and the specimen carrier 8. Good mechanical and thermal connection of the tank 4, the rod 6 and the specimen carrier 8 is obtained by soldering. The exterior surface of the specimen carrier 8 is coated in part by an electrically insulating layer 23, for example an oxide coat, which incorporates the material from which the specimen carrier 8 is made.

The surface of the specimen carrier 8 is provided with a helical groove 12 of triangular cross section for a thermometer wire 13, and with an annular groove 14 of circular cross section for a heating wire 15. If the groove 12 is of exactly triangular cross-sectional shape and the thermometer wire 13 of exactly circular cross-sectional shape, the groove 12 and the wire 13 will contact each other along two lines. The thermometer wire 13 and the heating wire 15 are electrically insulated from the specimen carrier 8 by means of the layer 23.

The lid 1 is transversed by a suction socket 16 which connects with the interior of the receiver 2, and by a filling socket 18 which connects with the interior of the tank 4 by means of a tube 17.

The suction socket 16 can be closed by a valve (not shown). A tube 19 for measuring the temperature of the cooling liquid 3 extends outwardly from the tank 4 and the receiver 2. In the drawing, only a portion of the tube 19 is shown, since the remainder of the tube is located in front of the plane of the drawing. The electrical connections of the thermometer wire 13 and the heating wire 15 are respectively laid along the tubes 17 and 19 and lead through the lid 1 to the outside. The lid 1 rests on a flange 20 of the receiver 2 and closes it hermetically. The receiver 2 has a window 22.

The specimen carrier is operated as follows: The receiver 2 is evacuated through the socket 16, and the tank 4 is filled with cooling through the socket 18 and the tube 17. Thus, by way of the rod 6, the temperature of the specimen carrier 8 and a specimen 11 placed on it is lowered to about that of the cooling means 3. When cooled, the crystal 11 (i.e. the specimen) is excited by radiation through the window 22. The specimen carrier 8 and, accordingly the crystal 11 are continuously heated by means of the heating wire 15 connected to a source of current (not shown). The emitted luminescence light can accordingly be observed and registered in dependency on the temperature of the specimen carrier 8 and the specimen 11, this temperature being controlled by means of the thermometer wire 13 and an electric circuit (not shown) outside the receiver 2.

The specimen carrier in FIG. 2 and 3 is a hollow cylinder 24 without covers which has an interior annular shoulder 25 for supporting a crystal 26. The exterior surface of the specimen carrier 24 is coated with an electrically insulating layer 27 and provided with a notch 28 for a heating wire coil 30 and a notch 29 for a thermometer wire coil 31. The wires 30 and 31 contact the specimen carrier 24 and are fixed to it by means of cement 32. A sleeve 33 of German silver sunk into the one end face of the specimen carrier 24 establishes connection with a cooling tank (not shown).

The specimen carrier 24 of FIG. 2 and 3 is assumed to be disposed in a receiver (cryostat) similar to that shown in FIG. 1. Whereas the specimen carrier of FIG. 1 is suitable for thermoluminescence tests, i.e. for emission processes, the specimen carrier shown in FIG. 2 is meant principally for absorption tests.

The embodiment of the invention particularly described is presented merely as an example of how the invention may be applied, other embodiments, forms and modifications of the invention falling within the scope of the appended claims will of course suggest themselves, for example, in the formation of the specimen carrier and the cryostat of the specimen, the coordination of the thermometer wire and the heating wire as well as in that of the specimen carrier and the cooling tank.

We claim:

1. A specimen carrier of good thermal conductivity which is suitable for physical tests at low and lowest temperatures and is connected to a resistance thermometer for measuring the temperature of the specimen and to a medium for cooling both the carrier and the specimen, characterized in that the carrier surface which is not connected with the cooling medium and does not serve for carrying the specimen is coated at least partly with an electrically insulating layer of a chemical compound of the material from which the carrier is made, and that at least part of the insulation-coated surface is surrounded by a coil of the resistance thermometer.

2. A specimen carrier as claimed in claim 1, wherein the thermometer wire is rigidly connected with the carrier.

3. A specimen carrier as claimed in claim 2, wherein the thermometer wire is cemented to the carrier.

4. A specimen carrier as claimed in claim 3, wherein a helical groove is provided in a carrier for receiving the thermometer wire.

5. A specimen carrier as claimed in claim 4, characterized in that it is made from aluminum or an aluminum alloy.

6. A specimen carrier as claimed in claim 5, characterized in that it is a hollow body.

7. A specimen carrier as claimed in claim 6, characterized by a rod of German silver located between the carrier and the colling means.